United States Patent Office 3,605,966
Patented Sept. 20, 1971

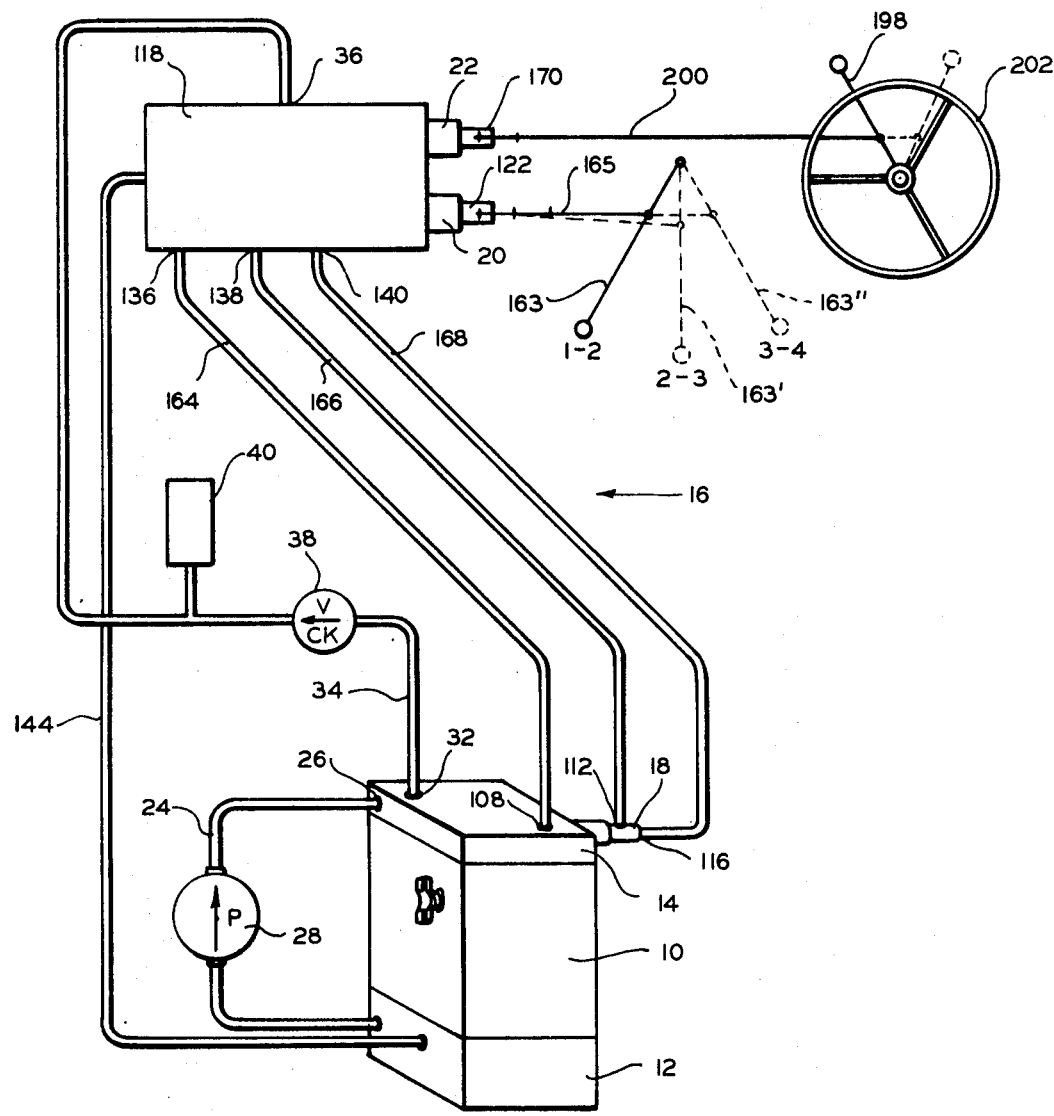

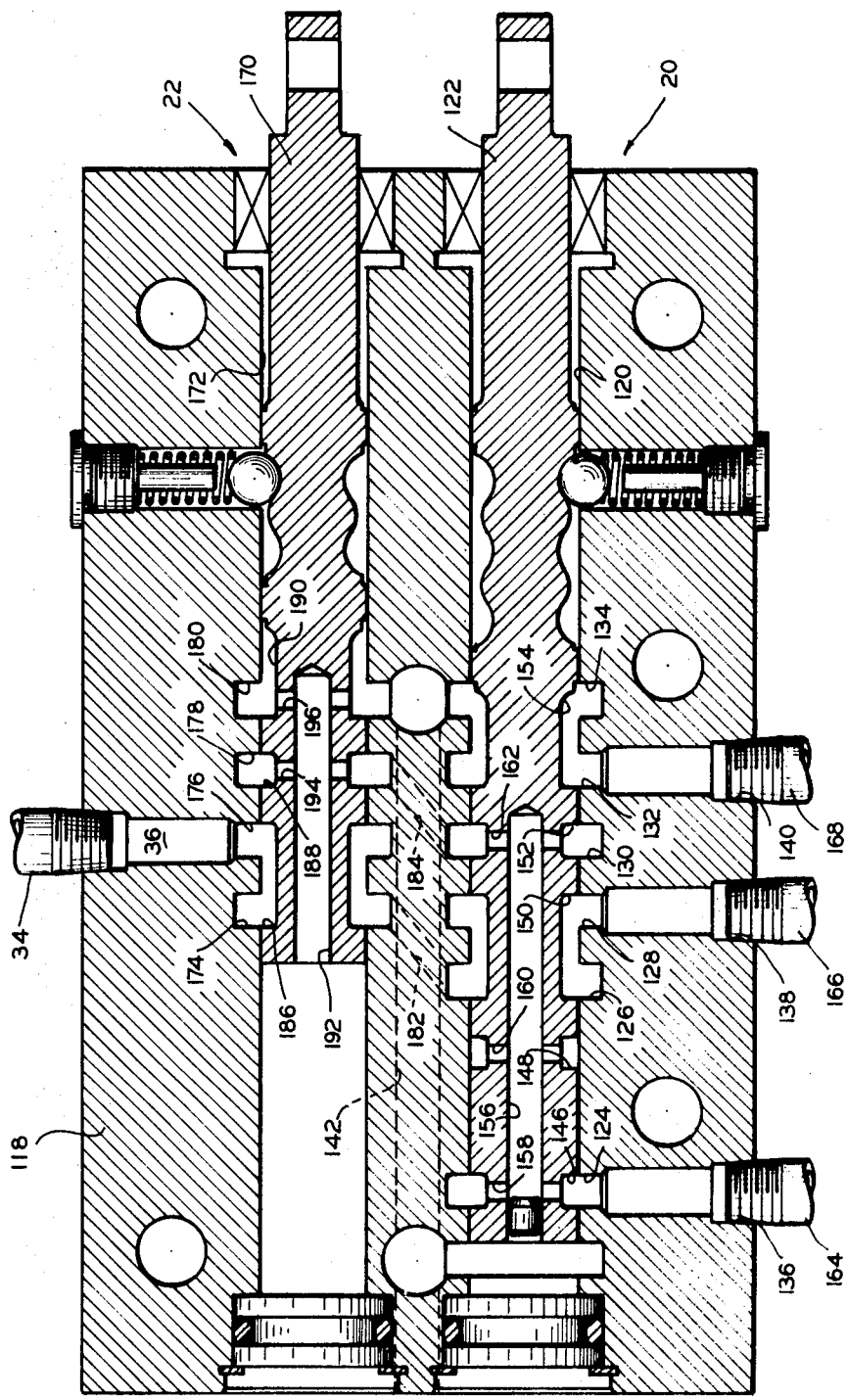

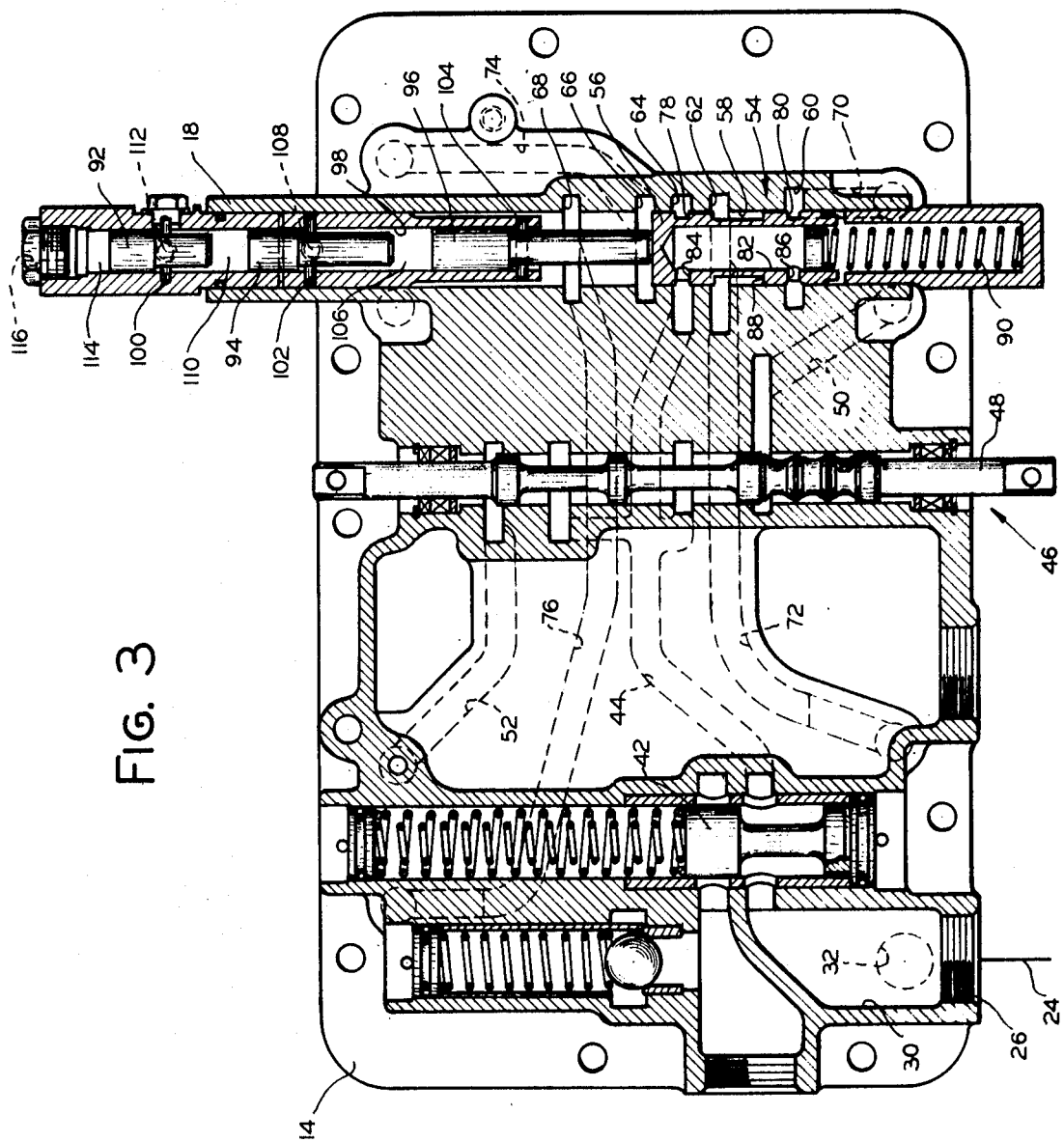

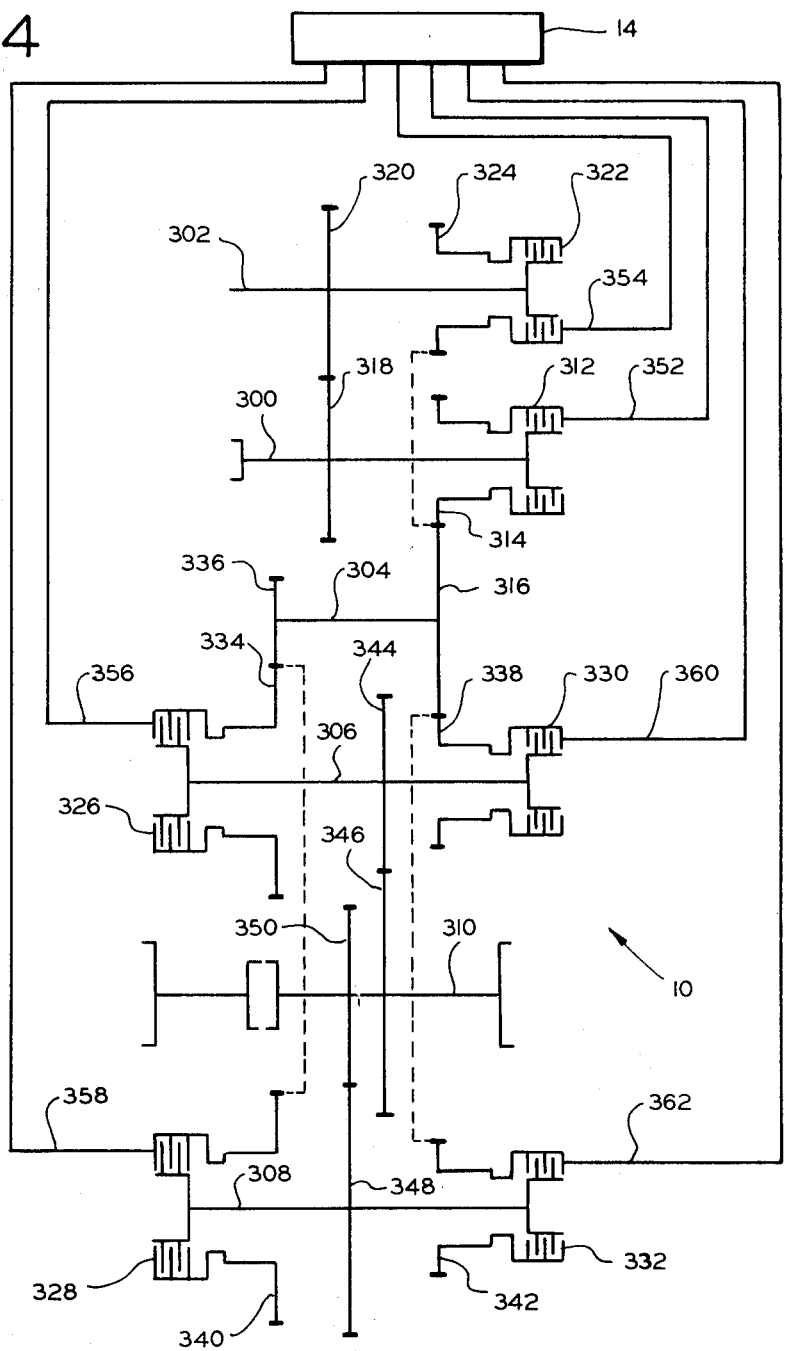

3,605,966
TRANSMISSION CONTROL SYSTEM
William C. Erdman, Tampa, Fla., assignor to
Clark Equipment Company
Continuation-in-part of application Ser. No. 783,373,
Dec. 12, 1968. This application May 25, 1970, Ser.
No. 40,181
Int. Cl. F16d 25/00; F16h 3/08; F17k 1/00
U.S. Cl. 192—87.18
4 Claims

ABSTRACT OF THE DISCLOSURE

A multiple speed ratio gear transmission with a control system for selecting different pairs of clutches for engagement and alternating engagement of the pair of clutches selected for engagement.

CROSS-REFERENCES TO RELATED APPLICATIONS

This application is a continuation-in-part of U.S. application Ser. No. 783,373, now abandoned, filed Dec. 12, 1968.

BACKGROUND OF THE INVENTION

The field of art to which this invention relates includes fluid handling systems, and more specifically systems having multi-way valve units.

A principal object of my invention is to provide an improved transmission control system.

SUMMARY OF THE INVENTION

In carrying out my invention in a preferred embodiment there is provided means for engaging the various clutches of a multiple speed ratio transmission. A range shifting valve is connected to a source of pressurized fluid and serves to direct pressurized fluid to one or the other of a pair of inlet ports in a range selecting valve. The range selecting valve is operable to direct pressurized fluid to an actuator and to condition various pairs of clutches for engagement.

The above and other objects, features and advantages of my invention will be more easily understood by persons skilled in the art when the detailed description is taken in conjunction with the drawing.

BRIEF DESCRIPTION OF THE DRAWING

FIG. 1 shows diagrammatically my invention in conjunction with a multiple speed ratio transmission, FIG. 2 is a longitudinal cross section showing in detail two valves which form a part of my invention, FIG. 3 shows a transmission control cover which forms part of my invention, and FIG. 4 is a diagrammatical representation of the multiple speed ratio transmission of FIG. 1 showing schematically its interconnection with the transmission control cover of FIG. 3.

DESCRIPTION OF THE PREFERRED EMBODIMENT

Referring now to FIG. 1, the reference numeral 10 denotes generally a multiple speed ratio transmission having a fluid reservoir 12 and a control cover 14 (FIG. 3) attached thereto. Engagement of transmission 10 is governed by means of a transmission control system 16 which includes control cover 14, a multi-position actuator 18, a speed ratio engagement conditioning valve 20 and a range shifting valve 22.

Referring now also to FIGS. 2 and 3, it will be seen that control system 16 includes a fluid conduit 24 connected to reservoir 12 and an inlet port 26 of control cover 14. Disposed in conduit 24 is a pump 28 which serves to draw fluid from reservoir 12 and supply pressurized fluid to inlet port 26 and hence a chamber 30. Also communicating with chamber 30 is an outlet port 32 to which one end of a conduit 34 is connected. The other end of the conduit 34 is connected to an inlet port 36 of range shifting valve 22. Disposed in conduit 34 is a check valve 38 which prevents back flow of fluid in conduit 34. An accumulator 40 is connected to conduit 34 and serves to prevent "hunting" of spools 92, 94 and 96 during shifts and minimizes fluid shocks in system 16 during operation of the system.

Referring now to FIG. 4, transmission 10 is a constant mesh transmission with fluid actuated disc clutches for connecting certain of the gears to certain of the shafts to provide various transmission speed ratios. Transmission 10 is arranged to provide four forward speeds and four reverse speeds. More specifically, transmission 10 includes, in addition to input shaft 300 a reverse shaft 302, an idler shaft 304, a pair of countershafts 306 and 308 and an output shaft 310. Input shaft 300 carries thereon a forward clutch 312 to which a gear 324 is connected that meshes with another gear 316 fixed to idler shaft 304. A gear 318 is fixed to input shaft 300 and meshes with another gear 320 which is fixed to reverse shaft 302. Reverse shaft 302 carries a reverse clutch 322 to which a gear 324 is connected. Gear 324 meshes with gear 316.

Also included in transmission 10 is a first speed ratio clutch 326, a second speed ratio clutch 328, a third speed ratio clutch 330, and a fourth speed ratio clutch 332. First and third speed ratio clutches 326 and 330 are carried by countershaft 306. First speed ratio clutch 326 has a gear 334 connected thereto which meshes with another gear 336 fixed to idler shaft 304. Similarly, third speed ratio clutch 330 has a gear 338 connected thereto which meshes with gear 316. Second speed ratio clutch 328 and fourth speed ratio clutch 332 are carried by countershaft 308. Second speed ratio clutch 328 has a gear 340 connected thereto which meshes with gear 336. Similarly, fourth speed ratio clutch 332 has a gear 342 connected thereto which meshes with gear 326. Fixed to countershaft 306 is a gear 344 which meshes with another gear 346 that is fixed to output shaft 310. Similarly, a gear 348 is fixed to countershaft 308 and meshes with another gear 350 which is fixed to output shaft 310. At this point it will be understood that the various clutches may be engaged by supplying them with pressurized fluid. Engagement of the various clutches causes the gear which is connected to the respective clutch to be fixed to the shaft which carries the clutch for conjoint rotation therewith. Further, power is transmitted through transmission 10 by engaging either forward clutch 312 or reverse clutch 322 and one of the four speed ratio clutches 326, 328, 330, or 332. For a more detailed explanation of a transmission which is similar to the present transmission, see U.S. Pat. No. 3,126,752 issued Mar. 31, 1964, in the name of R. H. Bolster.

Referring now to FIGS. 3 and 4, control cover 14 includes a pressure regulating valve 42 so that fluid at a predetermined pressure is supplied from chamber 30 to a fluid passage 44. Passage 44 supplies pressurized fluid to a direction control valve 46 which includes a spool 48 movable between three positions. In the centered position shown, the spool is in the neutral position. That is, neither forward clutch 312 nor reverse clutch 322 of transmission 10 will be engaged. By shifting spool 48 downwardly pressurized fluid from passage 44 will be directed to a passage 50 that is connected to the fluid passage 352, causing engagement of forward clutch 312. On the other hand, shifting of spool 48 upwardly will cause pressurized fluid to be directed from passage 44 to a passage 52 that is connected to fluid passage 354, causing engagement of reverse clutch 322.

Fluid passage 44 also extends to a speed ratio selection valve 54 which includes a spool 56 slidably disposed in a bore 58. Located in bore 58 are a plurality of grooves 60, 62, 64, 66 and 68. Groove 60 communicates with a fluid passage 70 that is connected with the fluid passage 356 for engagement of first speed ratio clutch 326 of transmission 10. Similarly groove 62 communicates with a fluid passage 72 that is connected with the fluid passage 358 for engagement of second speed ratio clutch 328 of transmission 10. Groove 64 communicates with fluid passage 44, and so supplies pressurized fluid to the other grooves, as will be explained shortly. Groove 66 communicates with a fluid passage 74 that is connected with the fluid passage 360 for engagement of third speed ratio clutch 330 of transmission 10. Also, groove 68 communicates with a fluid passage 76 that is connected with the fluid passage 362 for engagement of fourth speed ratio clutch 332 of transmission 10. All of the speed ratio clutches are arranged to be engaged when pressurized fluid is supplied to them through the respective fluid passages as is conventional in this art.

Spool 56 of selection valve 54 includes a pair of grooves 78 and 80 in the periphery thereof and located adjacent the ends. Grooves 78 and 80 are in fluid communication with each other by means of a longitudinal fluid passage 82, a plurality of fluid passages 84 which connect groove 78 with passage 82 and a plurality of fluid passages 86 which connect groove 80 with passage 82. Also located in the periphery of spool 56 intermediate grooves 78 and 80 is a groove 88. The disposition of the grooves in spool 56 and bore 58 is such that groove 64 which functions as a pressurized fluid supply groove and can be placed in fluid communication alternatively with grooves 60, 62, 66 or 68 with the result that any one of the speed ratio clutches 326, 328, 330, or 332 can be engaged singly. More specifically, with spool 56 in the position shown in FIG. 3 groove 64 is in fluid communication with groove 60 via fluid passages 84, 82 and 86. By shifting spool 56 upwardly slightly groove 64 will be placed in fluid communication with groove 62 via groove 88. Further upward shifting of spool 56 from that point will place groove 64 in fluid communication with groove 66 via groove 88. Additional upward movement of spool 56 will place groove 64 in fluid communication with groove 68 via fluid passages 86, 82 and 84.

Spool 56 is biased upwardly by means of a compression spring 90 and is shifted downwardly against the bias of spring 90 by means of actuator 18.

Actuator 18 includes three pistons 92, 94 and 96 slidably disposed in a bore 98. Downward movement of piston 92 is limited by means of a cross pin 100 which engages a slot in piston 92, and similarly downward movement of piston 94 is limited by means of a pin 102 which engages a slot in piston 94. Also, downward movement of piston 96 is limited by a pin 104 which engages a slot in piston 96. Piston 96 abuts the upper end of spool 56 and defines with piston 94 and bore 98 a chamber 106 with which a port 108 communicates. Pistons 92 and 94 define with bore 98 a chamber 110 with which a port 112 communicates and piston 92 defines with bore 98 a chamber 114 with which a port 116 communicates. The operation of actuator 18 is such that when pressurized fluid is supplied to chamber 106, piston 96 is forced downwardly until stopped by pin 104. This shifts spool 56 against the bias of spring 90 to the position shown in FIG. 3, which results in supply groove 64 being placed in fluid communication with first speed ratio clutch groove 60. If pressurized fluid is supplied instead to chamber 110, then piston 94 will be forced downwardly until stopped by pin 102 and spool 56 will be shifted upwardly by spring 90 until the top of piston 96 engages the bottom of piston 94. With spool 56 in this position supply groove 64 is placed in fluid communication with second speed ratio clutch groove 62. If pressurized fluid is supplied only to chamber 114, then piston 92 moves downwardly until stopped by pin 100 and spool 56 is moved upwardly by spring 90 until the top of piston 94 engages the bottom of piston 92, pistons 94 and 96 already being in abutment. When this occurs spool 56 is disposed so that supply groove 64 is in fluid communication with third speed ratio clutch groove 66. Finally, by supplying pressurized fluid to none of the chambers in actuator 18, spring 90 will shift spool 56 further upwardly until supply groove 64 is in fluid communication with fourth speed ratio clutch groove 68.

At this point it will be obvious that engagement of the various speed ratio clutches of transmission 10 can be controlled by the supply of pressurized fluid, or lack of supply of pressurized fluid, to chambers 106, 110 and 114 of actuator 18. Supply of pressurized fluid to these chambers is controlled by valves 20 and 22 which are shown in detail on FIG. 2.

Referring now to FIG. 2, it will be seen that valves 20 and 22 preferably are located in a single valve body 118, although this is not essential to the invention. Valve 20 includes a bore 120 in which a spool 122 is slidably disposed. Located in bore 120 is a plurality of longitudinally spaced apart annular grooves 124, 126, 128, 130, 132 and 134. Groove 124 communicates with an outlet port 136, and similarly grooves 128 and 132 communicate with outlet ports 138 and 140, respectively. Groove 126 communicates with valve 22 as will be explained shortly and functions as an inlet port. Similarly, groove 130 communicates with valve 22 and functions as an inlet port. Groove 134 communicates with a return passage 142 which in turn is connected to a return conduit 144 (FIG. 1) which communicates with reservoir 12.

Spool 122 of valve 20 includes a plurality of longitudinally spaced-apart grooves 146, 148, 150, 152 and 154 in the periphery thereof. Grooves 146, 148 and 152 are in fluid communication by means of a longitudinally extending fluid passage 156 disposed in spool 122 and which is connected with grooves 146, 148 and 152 by means of a plurality of fluid passages 158, 160 and 162 which communicate with grooves 146, 148 and 152, respectively.

A fluid conduit 164 is connected at one end to outlet port 136 and at the other end thereof to port 108 so that groove 124 is in fluid communication with chamber 106. Similarly, a fluid conduit 166 is connected at one end to outlet port 138 and at the other end to port 112 so that groove 128 is in fluid communication with chamber 110. A conduit 168 is connected at one end to outlet port 140 and at the other end thereof to port 116 so that groove 132 is in fluid communication with chamber 114.

Spool 122 is connected to a control lever 163 by means of a linkage 165 so that it can be shifted to any one of three different positions by an operator. With spool 122 in the position shown in FIG. 2 groove 130 is in fluid communication with outlet port 136 and hence chamber 106 of actuator 18. At the same time groove 126 is in fluid communication with outlet port 138 and hence chamber 110 of actuator 18 so that first and second speed ratio clutches 326 and 328 are conditioned for engagement. By shifting spool 122 towards the right, as viewed in FIG. 2, to its next position, groove 130 is placed in fluid communication with outlet port 138 and groove 126 is placed in fluid communication with outlet port 140 and hence chamber 114 of actuator 18 so that second and third speed ratio clutches 328 and 330 are conditioned for engagement. By shifting spool 122 further toward the right to its next position, groove 130 is placed in fluid communication with outlet port 140 and groove 126 is blocked from fluid communication with any outlet ports 136, 138 and 140 so that third and fourth speed ratio clutches 330 and 332 are conditioned for engagement.

Valve 122 includes a spool 170 slidably disposed in a bore 172. Located in the wall of bore 172 are four longitudinally spaced-apart annular grooves 174, 176, 178 and 180. Groove 174 is in fluid communication with groove 126 of valve 20 via a fluid passage 182, and similarly groove 178 is in fluid communication with groove 130 of valve 20 via a fluid passage 184. Groove 176 is in fluid communication with inlet port 36 and groove 180 connects with return passage 142.

Spool 170 of valve 22 includes three longitudinally spaced-apart annular grooves 186, 188 and 190 in the periphery thereof. Spool 170 also includes a longitudinally extending fluid passage 192 which extends inwardly from one end thereof and which communicates with grooves 188 and 190 via a plurality of fluid passages 194 and 196, respectively.

Spool 170 of valve 122 is connected to a control lever 198 by means of linkage 200 so that an operator can shift spool 170 between the position shown in FIG. 2 and a shifted position toward the right, as viewed in FIG. 2. With spool 170 in the position shown in FIG. 3 groove 176 is in fluid communication with groove 126, and at the same time groove 130 is in fluid communication with groove 180. When spool 170 is shifted to the right, groove 176 is placed in fluid communication with groove 130, and at the same time groove 126 is placed in fluid communication with groove 180.

In order to enable persons skilled in the art to better understand my invention, I will now explain the operation of it. It will be assumed that direction control valve 46 is actuated so that pressurized fluid from passage 44 is being supplied to fluid passage 352 through passage 50, and hence forward clutch 312 of transmission 10 is engaged. Also, it will be assumed that the operator of the vehicle with which transmission 10 is associated desires to operate in the first and second speed ratio range of transmission 10. Consequently, he will actuate control lever 163 to the position shown in FIG. 1 so that spool 122 is disposed as shown in FIG. 2. This places outlet 136, and hence chamber 106 in fluid communication with groove 178 of valve 22 and at the same time places outlet port 138 and hence chamber 110 of actuator 18 in fluid communication with groove 174 of valve 22. If the operator desires to operate in the second speed ratio of transmission 10 then he will actuate control lever 198 which is located adjacent steering control wheel 202 to the position shown in FIG. 1 so that spool 170 of valve 22 will be shifted to the position shown in FIG. 2. When this condition occurs pressurized fluid which is being supplied to inlet port 36 of valve 22 will be directed to groove 174, and hence to chamber 110 which, as has been explained previously, will position spool 56 of valve 54 so that pressurized fluid from passage 44 will be directed to groove 62 and from there through fluid passage 358, passage 44 will be directed to groove 62 and from there through fluid passage 358 to second speed ratio clutch 328 causing it to engage. If the operator desires to engage first speed ratio clutch 326 of transmission 10 it is necessary merely to actuate control lever 198 to the dotted outline position shown on FIG. 1 which causes spool 170 of valve 22 to be shifted to the right to its other position. In the rightward shifted position of spool 170 pressurized fluid supplied to inlet port 36 is directed to groove 178 and hence to chamber 106 which results in valve 54 being shifted to its lowermost position so that pressurized fluid from passage 44 is supplied to fluid passage 356 through groove 60 and hence to first speed ratio clutch 326. At this point it will be apparent that an operator can shift between first and second speed ratios of transmission 10 simply by moving control lever 198 between the two positions thereof when valve 20 is disposed as shown in FIG. 2.

Should the operator desire to utilize the second and third speed ratios of transmission 10, then he manipulates control lever 163 to move it to the dotted outline position indicated by 163′ which causes spool 122 of valve 120 to move to the right to the next shifted position thereof. As pointed out previously, with spool 122 in this position groove 178 of valve 22 is in fluid communication with outlet port 138 of valve 20 and groove 174 of valve 22 is in fluid communication with outlet port 140 of valve 20. Thus, with spool 170 of valve 22 in the position shown pressurized fluid from inlet port 36 will not be supplied to outlet port 140, and hence chamber 114 so that spool 54 is positioned to supply pressurized fluid from passage 44 to third speed ratio clutch 330. By shifting spool 170 of valve 22 to its other position pressurized fluid from inlet port 36 will be directed to outet port 138, and hence to chamber 110 so that valve 54 will be positioned to direct pressurized fluid from fluid passage 44 to second speed ratio clutch 328.

Finally, if the operator wishes to operate the transmission between third and fourth speed ratios he manipulates control lever 163 to the dotted outline position shown at 163″ which causes spool 122 of valve 20 to be shifted to its rightmost position which results in groove 178 of valve 22 being placed in fluid communication with outlet port 140 and groove 174 of valve 22 being blocked from fluid communication with valve 20. Thus, with spool 170 of valve 22 in the position shown in FIG. 2, no pressurized fluid will be supplied to actuator 18 with the result that spring 90 will shift spool 56 of valve 54 to its uppermost position which communicates pressurized fluid from passage 44 with fourth speed ratio clutch 332 causing it to engage. By shifting spool 170 of valve 122 to the right, pressurized fluid from inlet port 36 will be directed to outlet port 140, and hence chamber 114 which positions valve 54 to direct pressurized fluid from passage 44 to third speed ratio clutch 330 causing it to engage.

At this point it will be clear that my transmission control system permits an operator to choose two speed ratios of a transmission in which he wishes to operate the transmission, and then easily cycle between the two pre-selected speed ratios. This is a highly desirable arrangement in certain types of work cycles for machines such as front end loaders.

The above detailed description, while disclosing only a single embodiment, is intended to be illustrative only. My invention is subject to various modifications, changes and the like without departing from the scope and spirit of it. Consequently, the limits of my invention should be determined from the claims appended hereto.

What is claimed is:

1. For use with a transmission having a plurality of speed ratio clutches, a transmission control system comprising means for selectively engaging one of the speed ratio clutches at a time, means operatively connected to the said engaging means for actuating the said engaging means, means connected to the said actuating means for conditioning the said actuating means to engage a first pair of speed ratio clutches or a second pair of speed ratio clutches, and means connected to the said conditioning means for operating the said actuating means to engage one or the other of the speed ratio clutches of the pair of speed ratio clutches conditioned to be engaged.

2. A control system as set forth in claim 1 wherein the said actuating means includes first, second and third fluid operated pistons.

3. A control system as set forth in claim 2 wherein the said conditioning means is a valve having first and second inlet ports and first, second and third outlet ports, the said first, second and third outlet ports being connected to supply fluid to operate the said first, second and third pistons, respectively, the said valve being movable to a first position in which the said first inlet is in fluid communication with the said first outlet and the said second inlet is in fluid communication with the said second outlet, a second position in which the said first inlet is in fluid communication with the said second outlet and the said second inlet is in fluid communication with the said third outlet and a third position in which the said first inlet is in fluid communication with the said third outlet.

4. A control system as set forth in claim 3 and including a source of pressurized fluid and a fluid reservoir wherein the said operative means is a second valve having a third inlet port connected to the said source of pressurized fluid, a return port connected to the said reservoir and fourth and fifth outlet ports, the said fourth outlet port being connected to the said first inlet port and the said fifth outlet port being connected to the said second inlet port, the said second valve being movable between a fourth position in which the said third outlet port is in fluid communication with the said fourth outlet port, and the said return port is in fluid communication with the said fifth outlet port and a fifth position in which the said third inlet port is in fluid communication with the said fifth outlet port and the said return port is in fluid communication with the said fourth outlet port.

References Cited

UNITED STATES PATENTS

| | | | |
|---|---|---|---|
| 3,091,976 | 6/1963 | Johnson et al. | 74—364 |
| 3,198,027 | 8/1965 | Ramsel et al. | 74—364 |
| 3,389,770 | 6/1968 | Golan et al. | 192—87.13 |
| 3,425,293 | 2/1969 | Krawczyk et al. | 74—364X |
| 3,429,328 | 2/1969 | Morris et al. | 137—596X |
| 3,540,556 | 11/1970 | Snog et al. | 192—87.18X |

ARTHUR T. McKEON, Primary Examiner

U.S. Cl. X.R.

74—364; 137—596, 614; 91—167; 74—335